July 13, 1965 L. M. BACH 3,194,888

AUTOMATIC SIGNALING AND DIALING TELEPHONE SYSTEM

Filed Dec. 21, 1961

INVENTOR.
LOYAL M. BACH
BY Elliott & Pastoriza
ATTORNEYS 3,194,888

AUTOMATIC SIGNALING AND DIALING TELEPHONE SYSTEM

Loyal M. Bach, 17381 Sunset Blvd., Pacific Palisades, Calif.
Filed Dec. 21, 1961, Ser. No. 161,035
3 Claims. (Cl. 179—5)

This invention generally relates to a telephone signaling and dialing apparatus and more particularly concerns an apparatus for automatically dialing a particular emergency telephone number in response to a hazardous or dangerous circumstance such as a fire, burglary, or the like.

The primary purpose of the present invention is to provide an effective telephone dialing and signaling system which may be used for the most part in connection with homes to automatically call the fire or police department and signal the address or location of the building in the even of a sudden danger to the house or contents because of fire, burglary, or the like.

This problem has been recognized in the art for some years and several rather complex devices have been invented and suggested for connection to telephone lines. The simplicity of the apparatus and the degree to which the expense of construction, installation, and maintenance may be kept to a minimum are therefore very determinative factors as to the commercial success of any device provided for this application.

In consequence, one of the important objects of the present invention is to provide a telephone signaling and dialing device, particularly adaptable for residences, which is of an unusually simple construction, employs a minimum number of parts, and which does not require any substantial maintenance or installation expense.

Another object of the present invention is to provide a telephone signaling and dialing apparatus which may be remotely located from the telephone, preferably in a junction box under the house or in an otherwise safe location. Thus, it is desirable that installation be made in a place where the apparatus will not be subject to the hazards it has the function of signaling.

Still a further object of the present invention is to provide a telephone signaling and dialing apparatus which will send a continuous signal of the address or code indicating the location of the place where the hazardous or dangerous condition exists.

Still a further object of the present invention is to provide a telephone signaling and dialing device which is rugged and lends itself to mass production.

These and other objects and advantages of the present invention are generally achieved by providing in a telephone signaling and dialing apparatus a motor which may be either mechanically actuated by a spring or which is designed to be operated by electric power. A contact actuating means is designed to be driven by the motor, and the contact actuating means embodies a code identifying a particular phone number and address.

Contact means are provided which are designed to be opened and closed by the contact actuating means according to the given code embodied on the contact actuating means. The contact actuating means only function in response to energization of the motor.

An alarm circuit or alarm means is designed to energize the motor and connect the contact means across the telephone leads in response to a particular hazardous condition, such as a fire—or closure of an alarm circuit as a result of a protective screen, electric eye, or the like being broken.

A better understanding of the present invention will be had by reference to the drawing, disclosing only an illustrative embodiment thereof, and in which.

Figures 1, 2:
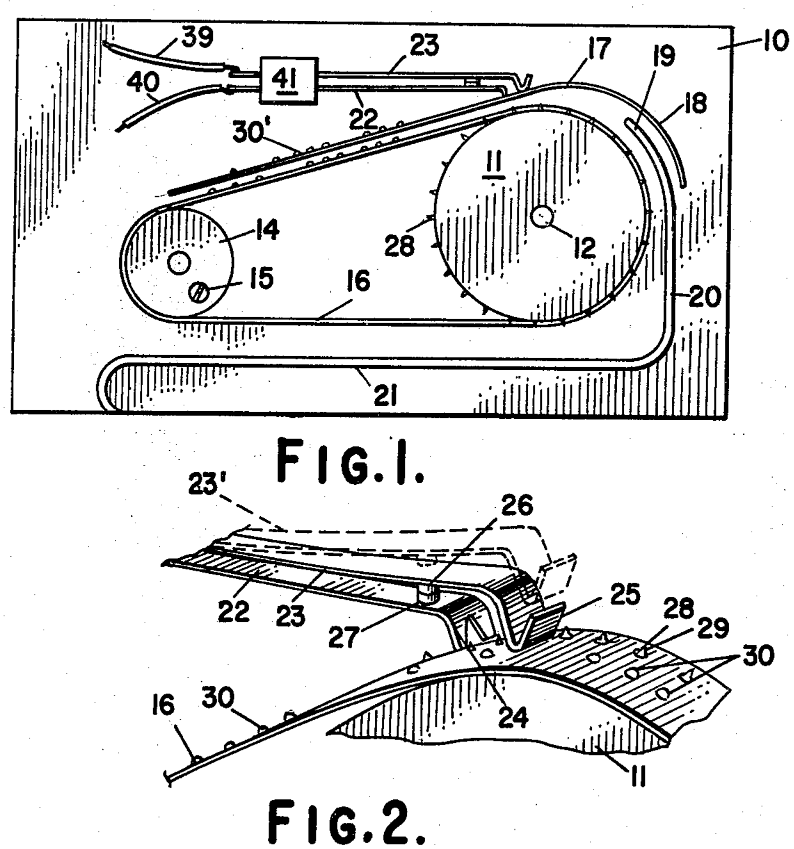
FIGURE 1 is a top plan view of the telephone signaling and dialing apparatus, according to the present invention, with the circuitry thereof not being shown.
FIGURE 2 is an enlarged perspective view of a part of the contact actuating means and contact means showing the co-functioning of these two elements; and, FIGURE 3 is a view of an illustrative circuit for use as a part of the telephone signaling and dialing apparatus, according to the present invention.

Referring now to the drawings, there is shown in FIGURE 1 a mounting plate 10 which may comprise the bottom of a box-like enclosure or the like for containing the elements to be hereafter described.

Figure 3:
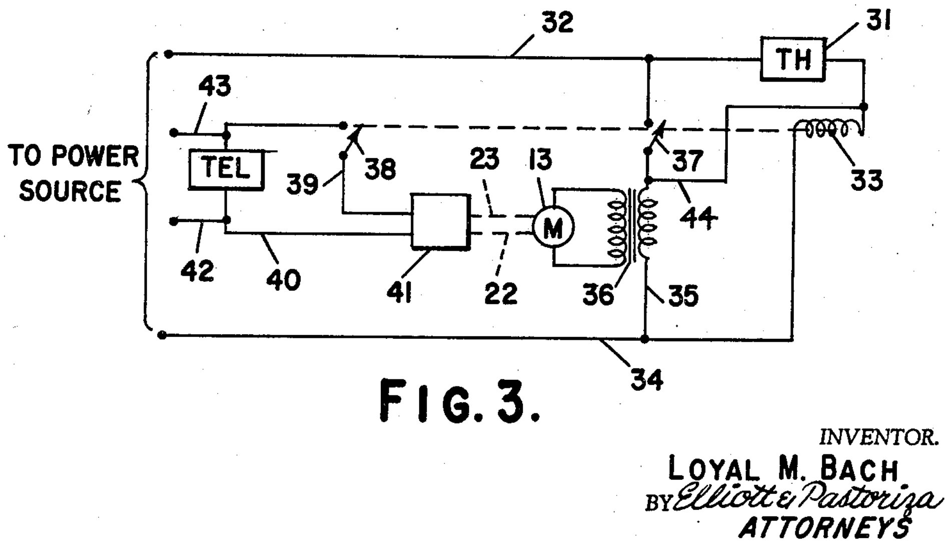

A driving sprocket 11 is mounted on the plate 10 and designed for rotation with respect thereto. The sprocket 11 is designed to be driven through a shaft 12 by a motor 13, as schematically indicated in FIGURE 3. In other words, although the motor 13 is not shown in the view of FIGURE 1, it would be normally be disposed behind the plate 10 and connected therethrough by the shaft 12 to the driving sprocket 11.

In addition to the driving sprocket 11, there is also shown mounted on the plate 10 and idler roller or driven sprocket 14 which is deigned to pivot about an eccentric screw 15. The eccentric screw 15 permits movement of the idler roller 14 to a position such that tension on the tape 16 (designed to be driven about the sprockets 11 and 14) may be tightened or loosened as desired.

In a simple embodiment of the present invention, the tape 16 may comprise conventional eight millimeter film modified as hereafter described.

In addition to the continuous loop of tape 16, there is also provided a length of or fragmentary portion of tape 17. The tape 17 has one end 18 which is designed to be normally positioned past one end 19 of a guide wall. The guide wall has a vertical portion 20 and a horizontal portion 21. The manner in which the tapes 16 and 17 function and co-function with each other will be better understood as the specification proceeds.

Biased into contact with the tape members 16 and 17 are contact means in the form of contact arms 22 and 23. As shown more clearly in the view of FIGURE 2, the contact arm 22 embodies a fork portion 24 while the contact arm 23 embodies a bent free end portion 25. In their normally closed positions, the contact arms 22 and 23 form a circuit through contact buttons 26 and 27.

A plurality of teeth 28 are provided about the periphery of the sprocket 11. The teeth 28 may be spaced, for example, as on the sprocket of a motion picture projector or the like to engage perforations along the side of the films or tapes 16 and 17. Thus, the film apertures are indicated at 29 as they register with the teeth 28.

As an important feature of the present invention, a plurality of nodes or dimpled raised portions 30 and 30' are formed on the tapes 16 and 17, respectively. These nodes 30 and 30' are designed to pass under the fork portion 24 of the contact arm 22 and engage the bent portion 25 of the contact arm 23 so as to raise the contact arm 23 to the position 23' and break the engagement between contact buttons 26, 27, thus interrupting the electrical circuit formed by these buttons.

The operation of the improved dialing and telephone signaling device, according to the present invention, may be better described with reference to FIGURE 3.

In one form, the telephone signaling and dialing apparatus may be embodied as part of electrical circuitry. Thus, a thermostat 31 may be provided in series with an electrical line 32, which is completed through a relay 33 and return lead 34. The thermostat 31 or other alarm device is normally open so that relay 33 will not be energized.

In response to a high temperature, for example, the thermostat 31 will close to connect the relay 33 to the power source as indicated.

Another line 35 is provided in parallel and embodies a transformer 36 and a switch 37 actuated by the relay 33. Thus, when the relay 33 is actuated, it closes the switch 37 and connects the line 35 so as to energize the transformer 36 and drive the motor 13. The motor 13, as discussed previously, drives the sprocket 11, which in turn effects movement of the contact actuating means in the form of tapes 16 and 17.

In addition, circuitry is provided such that the relay 33 will also close a switch 38 which will connect lines 39 and 40 through terminal box 41 across telephone leads 42 and 43. It should also be noted that jumper line 44 will maintain the relay 33 connected to the power source in the event the thermostat or other alarm device returns to its normally open position.

As indicated in FIGURE 1, the leads 39 and 40 are designed to be connected to a circuit closed by the contact arms 22 and 23. This circuit is also schematically illustrated in FIGURE 3. Thus, closing of the relay 33 in response to actuation of the thermostat 31 will initiate operation of the motor 13 and at the same time connect the leads 39, 40 across the telephone instrument leads 42, 43.

As will be noted in the view of FIGURE 1, the fragmentary tape portion 17 is positioned above the continuous loop of tape 16, and the tape portion 17, as heretofore mentioned, has its end portion 18 extending over the end 19 of the guide wall 20, 21. It should be mentioned that in the view of FIGURE 1, the tape 17 is shown spaced from the tape 16 for purposes of clarity although the two tapes are extremely thin and would normally be disposed adjacent each other.

In consequence, when a circuit is first established by operation of the relay 33, the sprocket 11 will commence rotating in a clockwise direction, as viewed in FIGURE 1 to initially drive the tape 17 under the contact arms 22, 23.

Because of the relative small protrusion of the nodes 30, 30′, the contact arm 23, and more particularly the bent end portion 25 thereof, will only sense the nodes 30′ on the upper tape 17 while the tape 17 is moving thereunder. The upper tape 17 is coded to the telephone number of the police department or fire department, according to the particular application. As the upper tape 17 moves by the contact arms 22, 23, it will finally be displaced by the walls 20 and 21 to a position where it cannot interfere with the further operation of the unit.

After the tape 17 has passed the contact arms 22, 23, the arm 23 will begin to sense the nodes 30 on the inner tape 16. In this regard, it is to be noted that it is desirable to have a blank space (free of nodes) on the inner tape 16 (or continuous loop) which will pass under the contact arms 22, 23, for an interval of time before the instant when the nodes 30 begin to engage the portion 25. In this way, the telephone will not be transmitting the code on the tape 16 until a space of time has elapsed after the transmission of the code on the tape 17 which causes a telephone to ring in the police or fire department. After this space in time, the nodes 30 on the tape 16 will engage the bent portion 25 to disengage the contacts 26 and 27 according to the code imposed on the tape 16. The code imposed on the tape 16 preferably is the address or location of the house or other building where the emergency exists. Of course, this code will be continuously transmitted so long as the motor 13 operates.

It will be appreciated that there are various methods of initiating operation of the motor 13 and closing the circuit to the telephone. In other words, although an electrical system is preferred, it is entirely possible to use a mechanical system in which the alarm device or thermostat 31 mechanically actuates a latch or spring which starts operation of a spring motor and at the same time closes contacts to the telephone instrument. In other words, although an electrical circuit is somewhat simpler to use, it is possible to use a mechanical structure as will be evident to one skilled in the art.

Furthermore, it should be noted that the circuit may be modified to include an inside and/or outside bell alarm and/or light signal which may also be energized by the relay 33 in a manner obvious to those skilled in the art.

It will also be appreciated that the structure of tapes 16 and 17 and associated nodes 30, 30′ may be varied and that the use of film modified to embody the nodes is merely a convenient means of accomplishing the objective.

These modifications and other variations obvious to those skilled in the art are deemed to lie within the scope of the present invention as set fotrh in the following claims.

What is claimed is:

1. In a telephone signaling and dialing apparatus: an electric motor; a contact actuating means designed to be driven by said motor, said contact actuating means comprising a first movable tape having nodes spaced thereon embodying a code identifying a particular phone number and a second movable tape of similar structure identifying a given location; contact means designed to be opened by said nodes according to said codes and in response to energization of said motor; and, alarm means connected to said power source and designed to energize said motor and connect said contact means across the leads to said telephone in response to actuation thereof.

2. In a telephone signaling and dialing apparatus: a motor; a sprocket driven by said motor; an idler roller mounted for rotation in said apparatus; a tape member designed to be driven about said sprocket and roller, said tape member being in the form of a loop and embodying a code in the form of nodes identifying a particular phone number and address; a second tape member overlapping said tape member of loop form; a pair of contact members biased into engagement with said tape members proximate said sprocket, one of said contact members being continually biased towards a closed position by said tape members and the other of said contact members being biased towards an open position at different intervals according to said code, and in response to energization of said motor; said second tape member being driven to a non-operative position in response to said energization of said motor after the code thereon has actuated said contact members; and, alarm means designed to energize said motor and connect said contact means across the leads to said telephone in response to actuation thereof.

3. The combination in a telephone signaling and dialing apparatus, according to claim 2, and guide means in said apparatus for guiding said second tape member to a non-operative position.

References Cited by the Examiner

UNITED STATES PATENTS

| | | | |
|---|---|---|---|
| 514,297 | 2/94 | Wilder | 200—46 |
| 2,088,002 | 7/37 | Scott | 179—5 |
| 2,453,239 | 11/48 | Luhn | 200—46 |

FOREIGN PATENTS

| | | |
|---|---|---|
| 213,530 | 7/56 | Australia. |
| 1,120,992 | 7/56 | France. |

DAVID G. REDINBAUCH, *Primary Examiner.*